Patented July 11, 1944

2,353,165

UNITED STATES PATENT OFFICE 2,353,165

INCREASING THE APPARENT SURFACE HARDNESS OF ENAMELS

Ignaz Kreidl and Werner Kreidl, Dunkirk, N. Y.

No Drawing. Application February 9, 1940, Serial No. 318,058

7 Claims. (Cl. 117—65)

This invention relates to a method for increasing the apparent surface hardness of vitreous enamels.

The present invention is based on the discovery that the apparent surface hardness of many enamels is diminished by gas bubbles which are present close to their surface or by microscopic pits formed by bubbles which have burst through the enamel surface on firing. If such enamels are scratched with a sharp tool such bubbles may cause breaking down of the enamel under the load even if the enamel in itself has a satisfactory hardness. Similarly also such microscopic pits which per se do not impair the glossy appearance of the enamel offer a sudden resistance to the sharp tool and give rise to a cracking loose of the enamel.

One object of this invention is a method for removing gas bubbles from the vicinity of the surface of the enamel. Another object of the invention is a special heat treatment for the removal of such gas bubbles. Another object of the invention is a method for removing such gas bubbles from the vicinity of the enamel surface by the use of special mill additions. Further objects will be apparent in the following description.

This invention is especially applicable to enamels to which gas forming substances are added arbitrarily as it is the case with gas opacified enamels. However, gases are present to a smaller or greater degree in any known type of enamel. In the usual enamels which are opacified with solid substances such as tin oxide such gas inclusions do not contribute anything to the opacity and even may cause severe defects. As can be seen, such arbitrary gas inclusions in gas opacified enamels have nothing in common with gas inclusions in enamels opacified with solid opacifiers. The gas inclusions present in enamels which are opacified with solid opacifiers are irregularly distributed and on the average of too great a size and too small an amount as to contribute to any substantial degree to the opacity. In gas opacified enamels the gases are finely and regularly distributed and of controlled size so as to provide diffraction, reflection, and refraction of light just in the same way as is the case with solid opacifiers. However, it is well known that most vitreous enamels are not free from gas inclusions which fact is due to the particular conditions prevailing in their production. The short firing time, the type of mill additions such a clay, the frit and many other factors will always cause the formation of more or less gas inclusions.

In the case of gas opacified enamels it sometimes may be observed that the opacifying gas bubbles will also be formed in the direct vicinity of the surface or, in other words, in the surface layer of the enamel coat. If this is the case the apparent surface hardness, as, for example, determined by the scratch hardness of the enamel, may be somewhat impaired. Generally this effect will be the less noticeable the smaller the opacifying gas bubbles and in many cases where opacification is brought about by extremely small gas bubbles this effect will be negligible even if the bubbles are right beneath the surface.

According to the present invention the apparent surface hardness of enamels having gas bubbles in its surface layer may be increased by subjecting the enamel to a treatment capable of removing gas bubbles from this layer or by preventing the formation of gas bubbles therein respectively. According to this invention this may be brought about by physico-chemical or by physical means causing the escape of gases from the vicinity of the surface prior to the final cooling of the fired enamel ware.

According to one way of carrying out our invention the enamels may be prepared and fired in the usual way. After the conventional firing process is completed—that is, after the enamel has become smooth and sufficiently melted throughout the mass—the surface will be subjected to at least a second heat treatment which is controlled in such a way that the surface due to rapid melting releases a substantial part of the included gases while the inner layers of the enamel have not sufficient time to be reheated to temperatures allowing any substantial diffusion, migration, or rising of gas bubbles toward the surface within that restricted period of time. Primarily two methods may be used for accomplishing the desired effect, namely—reheating of the fired enamel after at least partially cooling it or direct introduction of the fired enamel into another firing chamber. In both cases it will be desirable to subject the enamel to the second heat treatment for a substantially shorter time than to the first heat treatment in order to prevent any substantial changes in the enamel layers not adjacent to the surface layer. In other words, in the second heat treatment establishment of temperature equilibrium throughout the thickness of the enamel coat should be avoided.

The time required for such a second heat treatment will be dependent on the temperature prevailing during this second treatment and, generally speaking, it will be desirable to have this second heat treatment at as high temperatures and as short times as possible. In this manner the enamel surface will be subjected to a temperature shock and thus release a substantial part of the gas bubbles. Moreover, the short time of heat treatment will not allow any appreciable changes in the lower layers of the enamel coat so that gas inclusions in these lower layers will not be able to migrate towards the surface. If the enamel is cooled to some degree before the second heat treatment it will be possible under certain circumstances to have the second heat treatment at substantially the same furnace temperature as the first one, provided that it is carried out for a sufficiently short time so as to affect the surface only.

This method according to the present invention may be carried out by firing the enamel in the usual way in a muffle furnace and removing the enamel from said muffle and introducing it into the same furnace or into another furnace after having it brought to a higher temperature than was prevailing in the first firing step.

As stated above, the temperature of the second heating treatment may also be the same as that of the first heat treatment if the enamel is appropriately cooled in between these two steps. Such a procedure will be made possible especially in such cases where the furnace temperature for the ordinary firing process is relatively high so that in the short firing period the enamel does not quite assume the temperature of the furnace. If under those conditions the enamel is removed after a sufficient firing time and cooled down somewhat, it can be obtained that on second introduction of the enamel into the furnace for a considerably shorter time the surface is softened to such a degree that gas inclusions are released while the lower layers are still viscous enough to prevent rising of gas bubbles towards the surface. It should be noted that even where firing is carried at relatively lower temperatures and reheating is carried out at the same temperature the second heating should be carried out only for a fraction of the time used for the first heating.

In any case, the second heat treatment may be made more effective by using radiant heat such as produced by gas flames or electric heating elements so as to produce rapid heating of the enamel surface without establishing heat equilibrium throughout the enamel thickness.

In continuous operation, for example, in a tunnel furnace the enamel ware may be first taken through a zone of ordinary design for bringing about ordinary firing thereof. Subsequently, the ware may be taken through a cooling zone and then through a zone for the second heat treatment. Eventually the cooling zone may be left out entirely; however, in this case it would be advisable to have the second heating zone at a much higher temperature than the first heating zone. Of course, the temperature change from the first heating zone to the second heating zone must be sudden so as to provide the necessary conditions for the heat shock treatment of the surface layer only. Wherever it is possible the use of an intermediate cooling zone will be preferred. Also in continuous operation it is as a rule preferable to use radiant heat for the second firing process and to have the second zone at a higher temperature than the first and to pass the ware through it in a much shorter time.

According to another way of carrying out the present invention the removal of gases from the surface layer of the enamel coat may be brought about by physico-chemical means. It is known that many electrolytes have a marked influence on the absorption properties of colloidal matter such as clay. Use of this fact has been made for gas opacified enamels and is claimed in the U. S. Patent 1,948,461 of Feb. 20, 1934. According to the present invention electrolytes are made use of in an entirely new way. Heretofore such electrolytes have been only used to peptize and coagulate the clays in order to change their absorption power within a limited range and to change also their particle size.

According to the present invention such electrolytes are added in such amounts and balanced with such amounts of gas opacifiers that, at elevated temperatures but below the sintering temperature, a decrease in adsorption and consequently a decrease in the number and size of the gas bubbles formed is obtained in the vicinity of the surface while a sufficient amount of the opacifier is retained in the lower layers of the enamel to produce the desired opacity. In this way it is not only obtained that by the decrease of the number of gas bubbles adjacent to the surface but also that by the decrease of the average gas bubble size the apparent surface hardness of the enamel is increased.

It has been found that electrolytes, especially those of high mobility, when added to the enamel slip have a tendency to concentrate themselves on and near to the enamel surface on drying. This effect will be the more marked the higher the mobility of these electrolytes and the quicker the drying speed used. Appropriate control of the moisture in the drying room or drying chamber will also assist the concentration of the electrolytes on the surface. Accordingly, such electrolytes will be preferred which show a strong tendency of concentrating themselves on the surface of the enamel on drying.

The proper adjustment of the ratio of electrolytes and gas opacifier can only be found by experiment since the absorption conditions at elevated temperatures at which the release of the gases from the absorbent takes place are not known. However, the experimental procedure is quite simple and the following rules make it easy for anyone skilled in the art to carry out this method of the present invention. At first it will be necessary to determine the amount of electrolyte necessary for having in the surface layer a sufficient concentration thereof in order to cause sufficient release of gases near the surface. If the amount of gas opacifier used in such an experiment is the amount used for bringing about the desired opacity under ordinary conditions, as a rule, the opacity will drop under the desired degree of reflectance after the addition of the above specified amount of electrolyte. From there on both electrolyte and opacifier will have to be added until a ratio is reached where the concentration of the electrolyte near the surface is strong enough to reduce the size and number of gas bubbles in the desired degree while the amount of opacifier in the lower layers of the enamels is great enough to bring about the desired opacity in the presence of the relatively smaller concentrations of electrolytes in these lower layers.

It will be advantageous to use such gas opacifiers which have as little electrolytic character as possible and as little mobility as possible or, in other words, gas opacifiers which have no marked tendency to concentrate near the surface. Such gas opacifying agents are, for example, organic compounds having high molecular weights which are selected from the group consisting of dyestuffs, dyestuff intermediates, fatty acids and their salts, aromatic carboxylic acids and their salts, naphthols and the like. Especially suitable are gas opacifying agents selected from the group consisting of highly polymerized hydro-carbons, substitution products thereof, dispersions of such highly polymerized hydrocarbons and substitution products thereof, resins, pitches, tars, and asphalts as are described in U. S. Patent 2,103,228 of Dec. 21, 1937. Electrolytic gas opacifiers, such as formic acid and its salts or nitrates, when used in amounts in which they produce any noticeable opacification obviously are not very well suited for this modification of our invention.

The selection of a suitable electrolyte for any particular case will be relatively easy. The mobility of many electrolytes is well known. Many electrolytes will not be desirable for they may have detrimental effects on other properties of the enamel. As suitable electrolytes the alkali metal salts of hydrochloric acid, the basic and neutral salts of zirconium, tin, zinc and the like with hydrochloric and other halogenides may be named. These electrolytes are only called for by way of example and not as a limitation. Suitable selection of electrolytes for any given enamel and opacifier is for anybody skilled in the art a mere matter of a few routine experiments only.

Also this modification of the present invention is not limited to gas opacified enamels only but will also be useful where gases are formed in other enamels due to substances which are absorbed in the slip or the enamel bisque.

Any of the modifications of our invention may be used alone or in combination with each other. In many cases combination of the electrolyte treatment with the second heat treatment will lead even to superior results to any of the modifications alone.

Generally speaking, a decrease of the apparent surface hardness due to gas bubbles in the vicinity of the enamel surface in enamels which are opacified with solid opacifiers will be less marked insofar as such enamels contain by far less gaseous inclusions. However, locally such gaseous inclusions may be of greater disturbance since such gas bubbles are of much greater size and accordingly will have a much greater weakening effect on the surface.

Although the invention is not limited thereto, it need not be mentioned that it is only important for last coats, that is, for enamel coats the surface of which forms the surface of the finished ware.

The present invention, accordingly, is not limited to any particular kind of enamels or enamel compositions but is applicable to any kind of enamels such as white and colored enamels regardless whether they are prepared by the wet or dry method or for cast or sheet iron. The invention is to be understood in its broad scope as claimed in the appended claims.

What we claim is:

1. In the process for improving the apparent surface hardness of the vitreous enamel coat of enameled articles the step of subjecting the enameled article after the usual firing process to a second firing process at a higher temperature and for a shorter time than in the first firing process so that at least a substantial part of the gas bubbles in the surface layer of the enamel coat is released while the gases in the lower layers thereof are substantially retained.

2. The method of improving the apparent surface hardness of the vitreous enamel coat of enameled articles which consists in subjecting the enamel ware after the usual firing process to a cooling treatment and thereafter to a second firing process at a temperature which is sufficiently high so as to soften the surface of the said enamel coat so that at least a substantial part of the gas bubbles in said surface layer will be released.

3. The method of improving the apparent surface hardness of the vitreous enamel coat of enameled articles which are opacified with gas opacifiers which consists in subjecting the enameled article after the usual firing process to a second firing process at a higher temperature and for a shorter time than in the first firing process so that at least a substantial part of the gas bubbles in the surface layer of said coat is released while the lower layers of said coat will substantially retain the included gas bubbles.

4. The method of improving the apparent surface hardness of the vitreous enamel coat of enameled articles which consists in subjecting the enameled article after the usual firing process to a second firing process by means of radiant heat thus superficially providing a temperature on the surface of the enamel coat which is capable of softening the said surface so that at least a substantial part of the gas bubbles in said surface are released while the lower layers are not sufficiently softened to permit release of gas bubbles.

5. The method of improving the apparent surface hardness of the vitreous enamel coat of enameled articles in a continuous firing process which consists in passing the articles first through the conventional firing zone and subsequently through a cooling zone and through a second heating zone, the temperature in said second heating zone being higher and the time of passing through said second heating zone being shorter than in the conventional firing zone so that at least a substantial part of the gas bubbles in the surface layer of the said enamel coat is released.

6. The method of improving the apparent surface hardness of the vitreous enamel coat of enameled articles which consists in subjecting the enameled articles after the conventional firing process to a second firing process, said second firing process being carried out at at least the same temperature as used for the first firing process however for such a time only that the heat is insufficient to reheat the enamel coat throughout its entire thickness to the temperature obtained during the said first conventional firing process so that the surface of said enamel will be sufficiently softened to release at least a substantial part of the gas bubbles retained in the surface during the first firing process.

7. The method of improving the apparent surface hardness of the vitreous enamel coat of gas opacified enameled articles which consists in subjecting the enameled articles after the conventional firing process to a second firing process, said second firing process being carried out at at least the same temperature as used for the first conventional firing process however for such a time only that the heat is insufficient to reheat the enamel coat throughout its entire thickness to the temperature obtained during the said first conventional firing process so that the surface of the said enamel coat will be sufficiently softened to release at least a substantial part of the gas bubbles retained in the surface during the first firing process while the lower layers will substantially retain the bubbles necessary for providing the desired opacity.

IGNAZ KREIDL.
WERNER KREIDL.